(12) United States Patent
Cole et al.

(10) Patent No.: US 7,076,016 B1
(45) Date of Patent: Jul. 11, 2006

(54) METHOD AND APPARATUS FOR BUFFERING DATA SAMPLES IN A SOFTWARE BASED ADSL MODEM

(75) Inventors: Terry Lynn Cole, Austin, TX (US); Charles Ray Boswell, Jr., Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 0 days.

(21) Appl. No.: 09/514,843

(22) Filed: Feb. 28, 2000

(51) Int. Cl.
*H04L 23/00* (2006.01)
*H04L 25/00* (2006.01)
(52) U.S. Cl. .................. 375/377; 375/372
(58) Field of Classification Search .......... 375/377, 375/222, 372, 219, 316, 371, 354; 379/93.01
See application file for complete search history.

(56) References Cited

U.S. PATENT DOCUMENTS

| | | | | |
|---|---|---|---|---|
| 4,823,312 A | | 4/1989 | Michael et al. .......... 364/900 |
| 4,882,754 A | * | 11/1989 | Weaver et al. .......... 704/201 |
| 5,323,426 A | | 6/1994 | James et al. .......... 375/118 |
| 5,365,552 A | * | 11/1994 | Astle .......... 375/354 |
| 5,384,780 A | | 1/1995 | Lomp et al. .......... 370/94.1 |
| 5,450,132 A | * | 9/1995 | Harris et al. .......... 375/240.12 |
| 5,502,752 A | | 3/1996 | Averbuch et al. .......... 375/377 |
| 5,742,930 A | | 4/1998 | Howlitt .......... 705/502 |
| 5,751,741 A | | 5/1998 | Voith et al. .......... 37/37.7 |
| 5,799,064 A | | 8/1998 | Sridhar et al. .......... 379/98 |
| 5,903,612 A | | 5/1999 | Van Der Putten et al. .. 375/316 |
| 5,929,927 A | * | 7/1999 | Rumreich et al. .......... 348/563 |
| 5,946,347 A | | 8/1999 | Hudson et al. .......... 375/222 |
| 6,021,449 A | * | 2/2000 | Chow et al. .......... 710/57 |
| 6,144,695 A | | 11/2000 | Helms et al. .......... 375/222 |
| 6,201,830 B1 | | 3/2001 | Chellali et al. .......... 375/222 |
| 6,304,596 B1 | | 10/2001 | Yamano et al. .......... 375/222 |
| 6,519,280 B1 | | 2/2003 | Cole .......... 375/222 |
| 6,570,912 B1 | * | 5/2003 | Mirfakhraei .......... 375/222 |
| 6,658,027 B1 | * | 12/2003 | Kramer et al. .......... 370/516 |
| 2005/0094563 A1 | * | 5/2005 | Takeshita et al. .......... 370/235 |

FOREIGN PATENT DOCUMENTS

| | | |
|---|---|---|
| EP | 0429786 A3 | 9/1989 |
| EP | 0833269 | 9/1998 |
| EP | 0889615 A2 | 1/1999 |
| WO | 0429786 A2 | 6/1991 |
| WO | 0762655 A2 | 3/1997 |
| WO | WO 98/51067 | 11/1998 |
| WO | WO 99/52219 | 10/1999 |
| WO | WO 00/30298 | 5/2000 |
| WO | WO 00/46962 | 8/2000 |

OTHER PUBLICATIONS

International Search Report dated Oct. 4, 2000 (PCT/US99/25175).
International Search Report dated Nov. 11, 2000 (PCT/US00/21754).

* cited by examiner

*Primary Examiner*—Tesfaldet Bocure
(74) *Attorney, Agent, or Firm*—Williams, Morgan & Amerson (57) ABSTRACT

A method and apparatus for buffering data samples in a software-based ADSL modem. The method includes receiving samples of data in a buffer and determining if the received samples of data will exceed the storage capacity of the buffer. Selected samples of data from the buffer are deleted in response to the storage capacity being exceeded. The selected samples of data that were deleted are then reconstituted.

30 Claims, 5 Drawing Sheets

METHOD AND APPARATUS FOR BUFFERING DATA SAMPLES IN A SOFTWARE BASED ADSL MODEM

BACKGROUND OF THE INVENTION

1. Field of the Invention

The present invention relates generally to modem communications, and, more particularly, to a method and apparatus for buffering data samples in a software-based Asymmetric Digital Subscriber Line (ADSL) modem.

2. Description of the Related Art

In communications systems, particularly telephony, it is common practice to transmit signals between a subscriber station and a central switching office via a two-wire bi-directional communication channel. The Plain Old Telephone System (POTS), designed primarily for voice communication, provides an inadequate data transmission rate for many modem applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the Digital Subscriber Line (DSL) technology. DSL technology uses the existing network of telephone lines for broadband communications. An ordinary twisted pair equipped with DSL interfaces can transmit video, television, and high-speed data.

DSL technologies leave the POTS service undisturbed. Traditional analog voice band interfaces use the same frequency band, 0–4 Kilohertz (kHz), as telephone service, thereby preventing concurrent voice and data use. A DSL interface, on the other hand, operates at frequencies above the voice channels from 100 kHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetric Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface, Rev. R4, dated Jun. 12, 1998, which is incorporated herein by reference in its entirety.

ADSL modems use two competing modulation schemes: discrete multi-tone (DMT) and carrierless amplitude/phase modulation (CAP). DMT is the standard adopted by the American National Standards Institute. The standard defines 256 discrete tones, with each tone representing a carrier signal that can be modulated with a digital signal for transmitting data. The specific frequency for a given tone is 4.3125 kHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream. In a typical ADSL system, a central office (CO) modem communicates with a customer premise (CP) modem. The CP modem is typically installed in a home or office.

ADSL modems generally transmit and receive data in real-time. However, some real-time functions of these ADSL modems are being implemented as software routines, due to, among other things, decreased manufacturing costs and increased flexibility. These software routines are typically executed on a host computer running under a multi-tasking operating system, such as Microsoft Windows®, for example.

When performing non-real time functions, the ADSL modem is considered relatively unstable in that, at any particular time, the connection may be dropped or fail to transfer data properly if the operating system is delayed in providing the necessary support to the modem on a real-time basis. For example, if the operating system is delayed in providing modem routine processing or bus transfers on a real-time basis, the modem may drop its connection. This situation may occur when the operating system is heavily loaded servicing other routines, or when peripheral devices or device drivers seize system resources for relatively long periods of time. As a result of these dropped connections, the computer user is inconvenienced by having to re-establish the connection and re-initiate the data transfer.

The present invention is directed to overcoming, or at least reducing the effects of, one or more of the problems set forth above.

SUMMARY OF THE INVENTION

In one aspect of the present invention, a method is provided. The method includes receiving samples of data in a buffer, and determining if the received samples of data will exceed the storage capacity of the buffer. Selected samples of data from the buffer are deleted in response to the storage capacity being exceeded, and the selected samples of data that was deleted is reconstituted.

In another aspect of the present invention, an apparatus is provided. The apparatus includes a receiver adapted to receive samples of data, and a buffer adapted to store the received samples of data. A controller is also provided and adapted to determine if the received samples of data will exceed the storage capacity of the buffer, delete selected samples of data from the buffer in response to the storage capacity being exceeded, and reconstitute the selected samples of data that were deleted.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
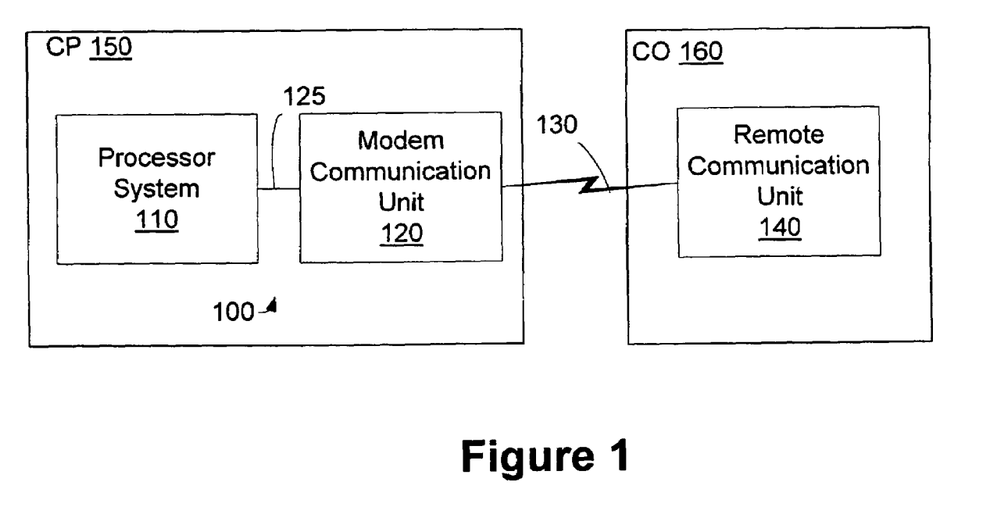
FIG. 1 is a block diagram of an ADSL DMT communications system in accordance with one embodiment of the present invention.

Turning now to the drawings, and specifically referring to FIG. 1, a block diagram of a communications system 100 in accordance with the present invention is provided. The communications system 100 includes a processor system 110 and a modem communication unit 120, coupled to the processor system 110 via a connection link 125. In the illustrated embodiment, the modem communication unit 120 is a DMT ADSL modem. The communications system 100 communicates with a remote communications device 140, which is also a DMT ADSL modem in one embodiment, on a real-time and non-real-time basis over a communications link 130. In the illustrated embodiment, the communications link 130 coupling the modem communication unit 120 and the remote communication unit 140 includes an ordinary twisted pair connection for communication via the Public Switched Telephone Network (PSTN) (not shown). It will be appreciated, however, that other known types of communications links could be used in lieu of the twisted pair connection, such as fiber, radio, and the like, if so desired.

In accordance with the illustrated embodiment, the communications system 100 resides in a customer premise (CP) 150, such as an office, home, or the like. The remote communication unit 140, on the other hand, is part of a central office 160. The remote communications unit 140 acts as a gateway to a larger communications network (not shown), such as a local or wide area network, or the Internet, for example. It will be appreciated, however, that the remote communications unit 140 may be installed in a second customer premise (not shown), instead of the central office 160, without departing from the spirit and scope of the present invention.

Typically, the modem communication unit 120 establishes a connection to the communication network (not shown) through the remote communication unit 140. During the process of establishing a connection, the modem communication unit 120 and the remote communication unit 140 engage in a training process whereby the throughput available for communication between the modem communication unit 120 and the remote communication unit 140 is determined. This may include, for example, ascertaining which tones are clear of impairments for modulating data thereon.

Figure 2:
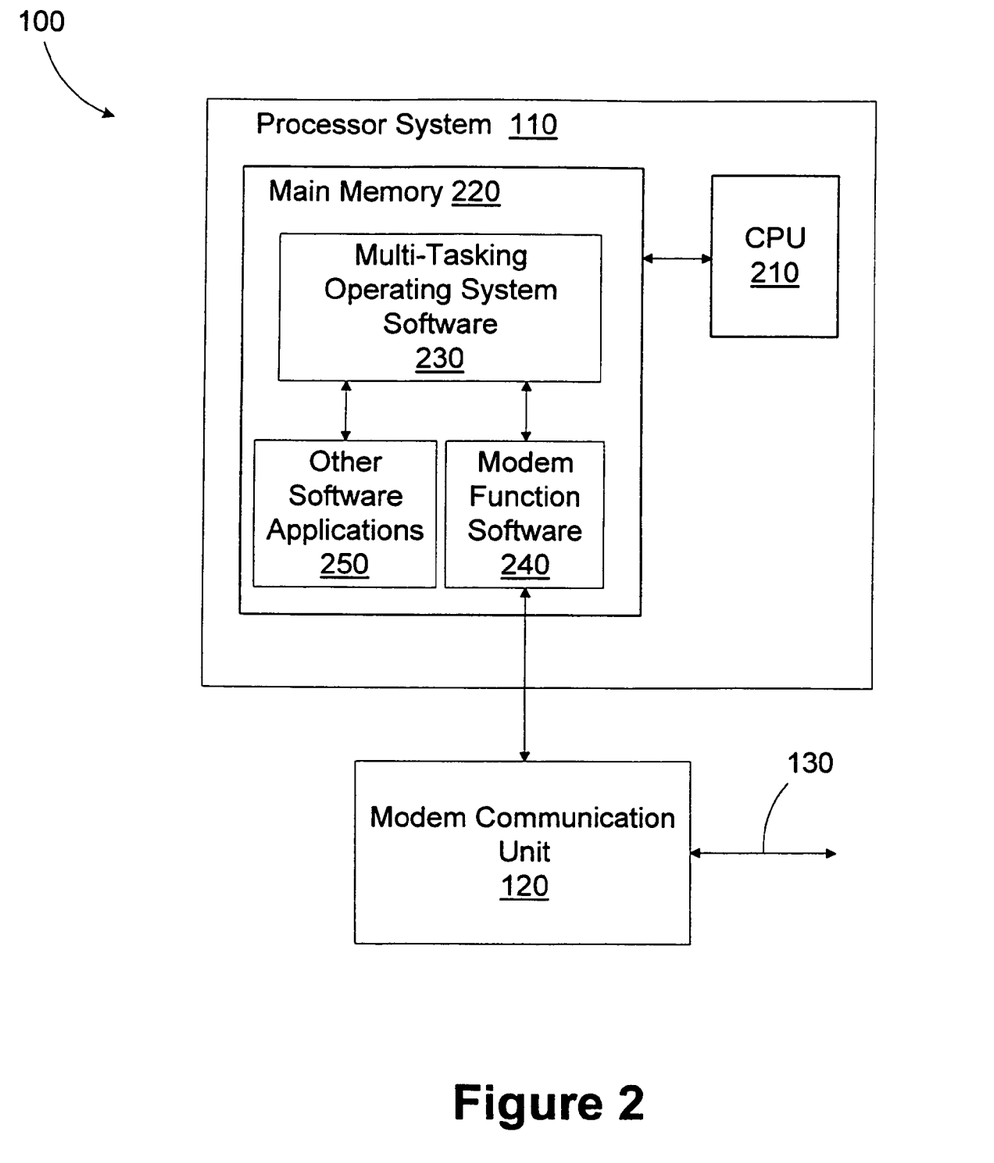
FIG. 2 is a block diagram of a processor system that forms a part of the communications system of FIG. 1.

Turning to FIG. 2, a block diagram of the processor system 110 of the communications system 100 is shown. The processor system 110 comprises a central processing unit (CPU) 210 and a main memory 220. The processor system 110, according to one embodiment, may be in the form of a personal computer available from a variety of manufacturers, such as Compaq Computer Corp., for example. In the illustrated embodiment, the CPU 210 executes multi-tasking operating system software 230, modem function software 240, and other application software 250 that reside in the main memory 220. The multi-tasking operating system software 230, in accordance with the illustrated embodiment, may not be real-time. Accordingly, the multi-tasking operating system software 230 may not always provide adequate resources from the CPU 210 to maintain continuous operation of the modem function software 240 and the other application software 250. This may result in a dropped communications link 130 between the modem communication unit 120 and the remote communication unit 140 or the loss of data therebetween.

Figure 3:
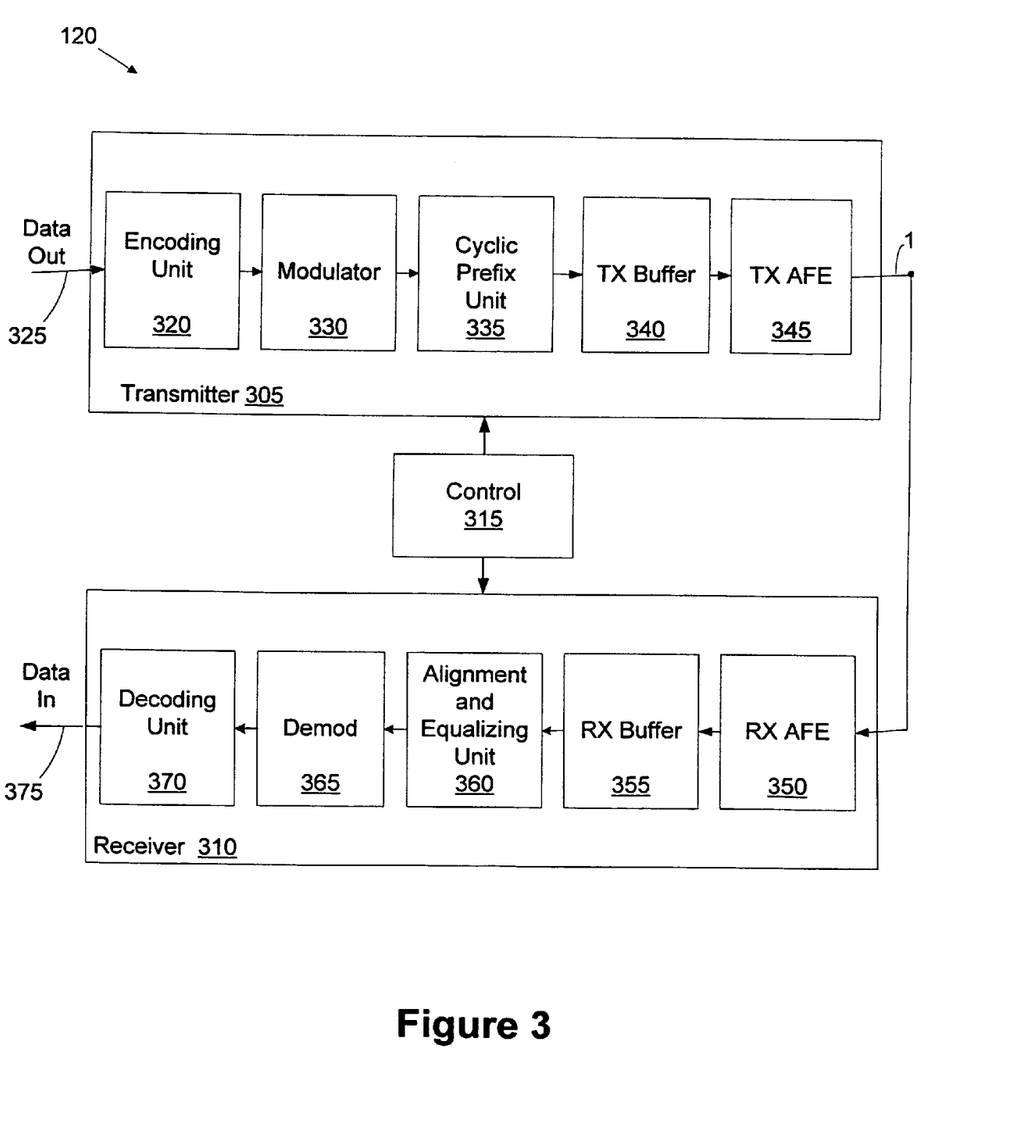
FIG. 3 is a block diagram of a modem communication unit that forms a part of the communications system of FIG. 1.

Turning now to FIG. 3, a simplified block diagram of the modem communication unit 120 is shown according to one embodiment of the present invention. For clarity and ease of illustration, not all functional blocks are illustrated in detail since they are known to those of ordinary skill in the art, and are further defined in documents such as the aforementioned ANSI T1.413 Issue 2 standard. The modem communication unit 120 includes a transmitter 305 and a receiver 310. The transmitter 305 and receiver 310 interface with the communications link 130, such as a telephone line, for communicating with the remote communication unit 140. A control unit 315 interfaces with the transmitter 305 and the receiver 310 to control the operation thereof. The control unit 315 is programmed with instruction sets to enable the modem communication unit 120 to perform various functions, such as establishing a connection and training the connection, for example. The interaction of the control unit 315 with the transmitter 305 and the receiver 310 will be further described in detail as the description proceeds.

The transmitter 305 includes an encoding unit 320 that receives outgoing digital data over a data-out line 325. The outgoing digital data is received from the processor system 1110 that is coupled to the modem communications unit 120 over the connection link 125, in which the data-out line 325 forms a part of the link 125. The encoding unit 320 performs functions such as cyclic redundancy checking (CRC), scrambling, forward error correction, and interleaving according to methods well known to those of ordinary skill in the art. These methods are further disclosed in the aforementioned ANSI T1.413 Issue 2 standard.

The transmitter 305 further includes a modulator 330 that modulates tone carriers with the transmitted data. The modulator 330 performs tone ordering, constellation encoding, gain scaling, and inverse discrete Fourier transform (IDFT) functions to provide time domain waveform samples. The time domain waveform samples are grouped into frames with a plurality of these frames, which number 68 in the illustrated embodiment, forming a super frame. The set of time domain waveform samples corresponding to a frame of data forms a DMT data symbol, which is transmitted over the communications link 130 to the remote communication unit 140. A DMT synch symbol is generated after each super frame. Accordingly, there are 68 data symbols followed by a synch symbol in the illustrated embodiment. Of course, the number of data symbols followed by a synch symbol may vary, and, thus, need not necessarily be limited to 68 as described above.

The transmitter 305 further includes a cyclic prefix unit 335, which inserts a cyclic prefix on the output signal of the modulator 330. That is, a portion of the output samples from the modulator 330 is replicated and appended to the existing output samples to provide an overlap and permit better symbol alignment.

A transmit buffer unit 340 receives and buffers the output samples prior to sending these samples to a transmit analog front end (TX AFE) 345. The transmit analog front end 345 includes a digital-to-analog (D/A) converter (not shown) and filter (not shown) for converting the digital output samples from the transmit buffer unit 340 to an analog waveform suitable for transmission over the communications link 130. As previously discussed, the communications link 130 typically consists of an ordinary twisted pair, thereby forming an analog phone connection between the modem communication unit 120 and the remote communication unit 140. The transmit analog front end 345 further includes ordinary telephone hybrid circuitry (not shown) for interfacing the modem communication unit 120 to the twisted pair connection using standard POTS (plain old telephone system) signaling techniques (e.g., two-wire to four-wire conversion, on and off-hook impedances, ring detection, FCC regulated electronics, etc.).

Typically, when the processor system 110 performs non-real-time functions, the modem communication unit 120 becomes unstable in that the connection with the remote communication unit 140 may be dropped or fail to transfer data properly if the operating system is delayed in providing the necessary support to the modem communication unit 120 on a real-time basis (i.e., a latency problem occurs). In accordance with the present invention, the transmit buffer 340 generates an appropriate DMT symbol for transmission to the transmit analog front end 345 to maintain continuous data transmission to the remote communication unit 140, provided that an absence of DMT symbols output from the cyclic prefix unit 335 occurs.

Figure 4:
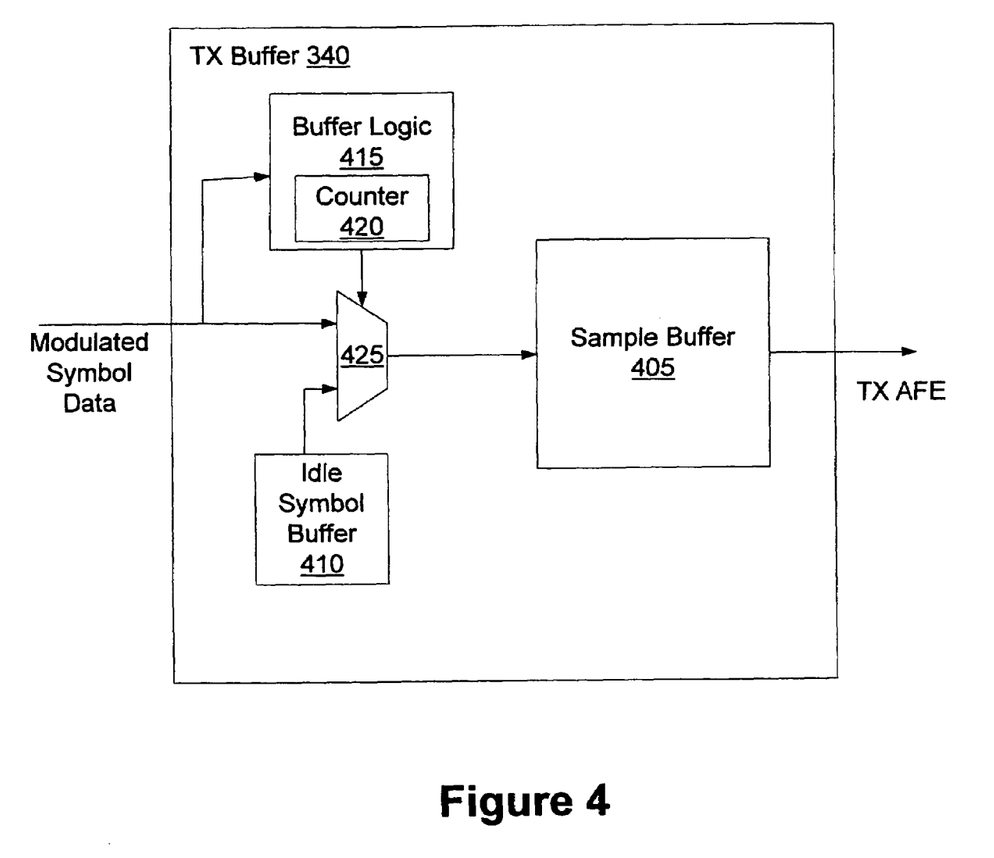
FIG. 4 is a block diagram of a transmit buffer unit of the modem communication unit of FIG. 3.

Turning now to FIG. 4, a simplified block diagram of the transmit buffer 340 is provided. The transmit buffer 340 includes a sample buffer 405 that receives the DMT symbols output from the cyclic prefix unit 335 and temporarily stores these samples therein prior to sending the samples to the transmit analog front end 345. The sample buffer 405 considers the digital samples corresponding to one DMT symbol to be a unit, although the sample buffer 405 contains multiple DMT symbols transmitted from the cyclic prefix unit 335. The transmit buffer 340 also includes an idle symbol buffer 410, which may generate either a DMT data or synch symbol for transfer to the sample buffer 405. The idle symbol buffer 410 couples to the sample buffer 405 via a multiplexer 425. The DMT symbols transferred from the cyclic prefix unit 335 are also sent to the multiplexer 425 prior to being transferred to the sample buffer 405. Buffer logic 415, which includes an internal counter 420, is provided for keeping track of the time slot containing a DMT synch symbol each time a symbol is transferred out of the sample buffer 405 to the transmit analog front end 345. In accordance with one embodiment, the internal counter 420 is a modulo counter. It will be appreciated, however, that the internal counter 420 may include other types of counters without departing from the spirit and scope of the present invention. To track the synch symbols, the transmit buffer 340 is first initialized by having the control unit 315 signal the position of the DMT synch symbols, which may be accomplished at the start of the modem communication unit's data mode following the training procedure. It will be appreciated, that the initialization of the transmit buffer 340 may occur at other times as well, and may even occur repeatedly, if so desired. The buffer logic 415 is further configured to determine when the output of the cyclic prefix unit 335 is idle, and to have the idle symbol buffer 410 generate either a DMT data or synch symbol depending on which one is needed.

In a normal mode of operation (i.e., where the DMT symbols are being transferred and latency does not occur), the transmit buffer 340 moves the transmitted DMT data and synch symbols as received by the sample buffer 405 from the cyclic prefix unit 335 to the transmit analog front end 345. In an alternative embodiment, the DMT synch symbols are not transferred to the input of the transmit buffer 340, but may be generated at the appropriate times by the buffer logic 415 itself, and appropriately inserted as the synch symbols are needed as indicated by the internal counter 420. As previously indicated, the internal counter 420 keeps track of the position of the synch symbols relative to the data symbols.

When a latency problem occurs, and the transmit buffer 340 does not receive a new DMT symbol for output to the transmit analog front end 345, the idle symbol buffer 410 creates either a DMT data or synch symbol based upon the results obtained by the buffer logic's internal counter 420. As previously discussed, this may be determined from the DMT symbols being transmitted in a particular pattern (namely, the synch symbol periodicity). If the buffer logic 415 determines that a synch symbol is needed, then the idle symbol buffer 410 generates the appropriate synch symbol. The synch symbol generated from the idle symbol buffer 410 may come from a stored synch symbol transferred earlier from the processor software, from a previously transmitted symbol stored by the buffer 405 when the internal counter 420 of the buffer logic 415 indicated that the transmitted symbol was a synch symbol, or may come from some other internally computed source (not shown). If, however, the buffer logic 415 determines that a data symbol is needed, then the idle symbol buffer 410 generates the appropriate data symbol, which may come from various sources. For example, the generated data symbol may be a copy of a previous symbol that was already buffered, a slight modification to a previously buffered symbol, a simple pilot tone, or generated from some other internally computed source (not shown).

Accordingly, when software is executed by the processor system 110 on a non-real-time basis, the generating and transferring of idle data and synch symbols by the transmit buffer 340 to the transmit analog front end 345 significantly reduces the risk of a connection and/or data loss between the modem communication unit 120 and remote communication unit 140.

In accordance with one embodiment, the software executed on the processor system 110 is informed when a synch or data symbol has been inserted into the stream. This may be accomplished by the control unit 315 passing back information to the software when an insertion event occurs by an underflow bit counter (not shown) to indicate how many symbols have been inserted automatically while the software was operating in non-real-time. Alternatively, the system 100 may be configured such that the software may be able to read the counter 420 directly, and determine any non-sequential event directly.

Referring back to FIG. 3, the receiver 310 includes a receive analog front end (RX AFE) 350 that receives an analog waveform over the analog phone communications link 130. The receive analog front end 350 includes ordinary hybrid circuitry for interfacing the modem communication unit 120 to the analog phone connection of the communications link 130 with the remote communication unit 140 as previously discussed. The receive analog front end 350 further includes an analog-to-digital (A/D) converter (not shown) and filter (not shown) for converting the analog waveform into time domain digital samples.

Figure 5:
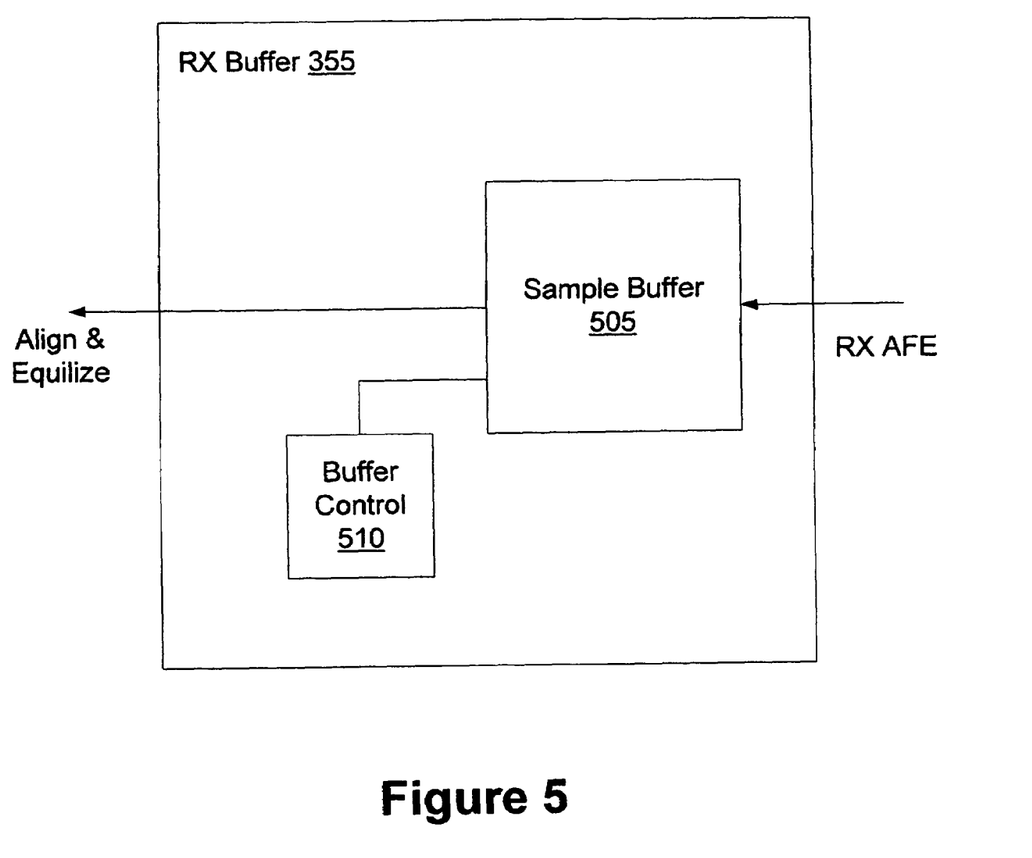
FIG. 5 is a block diagram of a receive buffer unit of the modem communication unit of FIG. 3.

The receive analog front end 350 transfers the samples to a receive buffer 355. Referring to FIG. 5, a basic block diagram of the receive buffer 355 is provided. The receive buffer 355 includes a sample buffer 505 that receives the samples transferred from the receive analog front end 350 on a sample by sample basis. The receive buffer 355 further includes a buffer control 510, which is coupled to the sample buffer 505. The buffer control 510 determines if there was any overrun of samples in the sample buffer 505, and provides an indication of such if any samples were lost.

The samples buffered in the receive buffer 355 are transferred to an alignment and equalizing unit 360 (see FIG. 3), which performs symbol alignment and time domain equalization, as is well established in the art. In time domain equalization, since the tones are at different frequencies, certain frequencies travel faster than others, and, as such, the tones may not arrive at the same time. The time domain equalization function of the alignment and equalizing unit 360 delays the faster tones to compensate for the propagation speed differences. There is a performance trade off between the frame alignment and time domain equalization functions in that a higher degree of frame alignment accuracy allows a lower degree of accuracy in time domain equalization. The cyclic prefix insertion performed by the modem communication unit 120 improves symbol alignment accuracy. The alignment and equalizing unit 360 also performs gain control to increase the amplitude of the received signal.

A demodulator 365 receives the time domain samples from the alignment and equalizing unit 360 and converts the time domain data to frequency domain data to recover the tones. The demodulator 365 performs a slicing function to determine constellation points from the constellation encoded data, a demapping function to map the identified constellation points back to bits, and a decoding function (e.g., Viterbi decoding, if trellis constellation coding is employed). The demodulator 365 also performs tone deordering to reassemble the serial bytes that were divided among the available tones.

A decoding unit 370 performs forward error correction, CRC checking, and descrambling functions on the data received from the demodulator 365 using methods well known to those of ordinary skill in the art. The reconstructed data provided by the decoding unit 370 represents the sequential binary data that was sent by the remote communication unit 140. The reconstructed data is provided to a data-in line 375 for sending the digital data to the processor system 1110 coupled to the modem communication unit 120. The data-in line 375, along with the data-out line 325 previously discussed, form the connection link 125 between the processor system 110 and modem communication unit 120.

In a normal mode of operation in the receiver 310, where there is no overrun of the sample buffer 505, the sample buffer 505 transfers the samples directly to the alignment and equalizing unit 360 since there is no sample loss. However, when a latency problem occurs in the receiver 310, and the sample buffer 505 cannot hold all of the samples, the buffer control 510 will delete some of the samples. In accordance with one embodiment, the buffer control 510 may delete samples in contiguous blocks at the head, end, or middle of the buffered data within the sample buffer 505. The buffer control 510 will store the precise starting and ending location of any deleted samples and transfer this location information to the receive software running on the control unit 315 along with the remaining samples from the sample buffer 505 such that the deleted data may be reconstituted. Alternatively, the buffer control 510 may delete the samples of the sample buffer 505 corresponding to every nth sample. The buffer control 510 would also record the exact start, stop, and step used, and transfer this information to the receive software running on the control unit 315 along with the remaining samples.

In another embodiment, the data in the sample buffer 505 may be compressed. To accomplish this, the buffer control 510 may employ a rounding or truncation method to reduce the resolution of samples, and, hence, permit the samples to be stored in fewer buffer memory locations (not shown) of the sample buffer 505. The buffer control 510 records the exact location where the rounding or truncation occurred, and transfers this information to the receiver software so that the compressed samples may be expanded and restored.

In yet another embodiment, the buffer control 510 may employ a piecewise linear compression scheme to compress the data in the sample buffer 505. The samples compressed and later restored has typically less noise added than with the truncation or rounding methods discussed previously.

The receive software running on the control unit 315 is configured to comprehend that it is part of a software modem operating in a non-real-time environment. The software checks if there is any lost or partially lost samples as it transfers data from the receive buffer 355. If there are any lost samples, the control unit 315 may insert zeros, average data, or use other known techniques to estimate the missing samples. If the samples were compressed by the buffer control 510, then the control unit 315 appropriately decompresses the samples.

In an alternative embodiment, the receive buffer 355 may be equipped with a superframe counter (not shown), where alignment of the superframe counter would be accomplished by the buffer control 510. With the superframe counter, the buffer control 510 may delete the superframe synch symbols without any loss of data when space is needed in the sample buffer 505. Additionally, by providing the superframe counter, the buffer control 510 may alternatively delete samples in the cyclic prefix area of the transmitted data because the cyclic prefix may be approximated by their redundant portions within the frame (i.e., the cyclic prefix is simply a repetition of part of the frame).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   determining if samples of data being received will exceed the storage capacity of a buffer;
   deleting selected samples of data from the buffer in response to the storage capacity being exceeded; and
   reconstituting the selected samples of data deleted.

2. The method of claim 1, wherein deleting selected samples of data from the buffer in response to the storage capacity being exceeded, further comprises:
   deleting selected samples in contiguous blocks of the buffered data within the buffer.

3. The method of claim 1, wherein deleting selected samples of data from the buffer in response to the storage capacity being exceeded, further comprises:
   deleting selected samples by every nth sample of the buffered data within the buffer.

4. The method of claim 2, wherein deleting selected samples in contiguous blocks of the buffered data within the buffer, further comprises:
   recording the locations of a starting and ending point defining the continuous block being deleted.

5. The method of claim 4, wherein reconstituting the selected samples of data deleted, further comprises:
   reconstituting the selected samples of data deleted based in part upon the recorded locations.

6. The method of claim 3, wherein deleting selected samples by every nth sample of the buffered data within the buffer, further comprises:
   recording the locations of a starting and ending point defining the nth samples being deleted.

7. The method of claim 6, wherein reconstituting the selected samples of data deleted, further comprises:
   reconstituting the selected samples of data deleted based in part upon the recorded locations.

8. A method, comprising:
   determining if samples of data being received will exceed the storage capacity of a buffer;
   deleting selected samples of data from the buffer in response to the storage capacity being exceeded;
   reconstituting the selected samples of data deleted; and
   performing symbol alignment and time domain equalization on the received samples from the sample buffer.

9. A method, comprising:
   determining if samples of data being received will exceed the storage capacity of a buffer;
   deleting selected samples of data from the buffer in response to the storage capacity being exceeded;
   reconstituting the selected samples of data deleted; and
   performing symbol alignment and time domain equalization on the received samples from the sample buffer in response to the storage capacity of the buffer not being exceeded.

10. A method, comprising:
    determining if samples of data being received will exceed the storage capacity of a buffer;
    deleting selected samples of data from the buffer in response to the storage capacity being exceeded;
    reconstituting the selected samples of data deleted; and
    performing symbol alignment and time domain equalization on the received samples from the sample buffer in response to the storage capacity of the buffer being exceeded after reconstituting the selected samples that were deleted.

11. A method, comprising:
    determining if samples of data being received will exceed the storage capacity of a buffer;
    compressing the samples of data from the buffer in response to the storage capacity being exceeded; and
    decompressing the samples of data that were compressed.

12. The method of claim 11, wherein compressing the samples of data, further comprises:
    rounding the samples of data from the buffer in response to the storage capacity being exceeded.

13. The method of claim 11, wherein compressing the samples of data, further comprises:
    truncating the samples of data from the buffer in response to the storage capacity being exceeded.

14. The method of claim 12, wherein compressing the samples of data from the buffer in response to the storage capacity being exceeded, further comprises:
    recording the locations of a starting and ending point defining the data being compressed.

15. The method of claim 14, wherein decompressing the samples of data that were compressed, further comprises:
    decompressing the samples of data that were compressed based in part upon the recorded locations.

16. An apparatus, comprising:
    a receiver adapted to receive samples of data;
    a buffer adapted to store the received samples of data; and
    a controller adapted to determine if samples of data being received will exceed the storage capacity of the buffer, delete selected samples of data from the buffer in response to the storage capacity being exceeded, and reconstitute the selected samples of data deleted.

17. The apparatus of claim 16, wherein the controller is further adapted to delete selected samples in contiguous blocks of the buffered data within the buffer.

18. The apparatus of claim 16, wherein the controller is further adapted to delete selected samples by every nth sample of the buffered data within the buffer.

19. The apparatus of claim 17, wherein the controller is further adapted to record the locations of a starting and ending point defining the continuous block being deleted.

20. The apparatus of claim 19, wherein the controller is further adapted to reconstitute the selected samples of data deleted based in part upon the recorded locations.

21. The apparatus of claim 18, wherein the controller is father adapted to record the locations of a starting and ending point defining the nth samples being deleted.

22. The apparatus of claim 21, wherein the controller is further adapted to reconstitute the selected samples of data deleted based in part upon the recorded locations.

23. An apparatus, comprising:
    a receiver adapted to receive samples of data;
    a buffer adapted to store the received samples of data; and
    a controller adapted to determine if samples of data being received will exceed the storage capacity of the buffer, compress the samples of data from the buffer in response to the storage capacity being exceeded, and decompress the samples of data that were decompressed.

24. The apparatus of claim 23, wherein the controller is further adapted to round the samples of data from the buffer in response to the storage capacity being exceeded.

25. The apparatus of claim 23, wherein the controller is further adapted to truncate the samples of data from the buffer in response to the storage capacity being exceeded.

26. The apparatus of claim 24, wherein the controller is further adapted to record the locations of a starting and ending point defining the data being compressed.

27. The apparatus of claim 26, wherein the controller is further adapted to decompress the samples of data that were compressed based in part upon the recorded locations.

28. A method, comprising:

determining if samples of data being received will exceed the storage capacity of a buffer;

deleting selected samples of data from the buffer in response to the storage capacity being exceeded, wherein deleting the selected samples comprises determining at least one buffer location associated with the deleted samples; and reconstituting the selected samples of data deleted.

29. The method of claim 28, wherein determining the at least one buffer location associated with the deleted samples comprises determining a starting and an ending buffer location associated with the deleted samples.

30. The method of claim 28, wherein reconstituting the selected samples of data deleted comprises reconstituting the selected samples of data deleted based in part upon the determined buffer location.

\* \* \* \* \*

UNITED STATES PATENT AND TRADEMARK OFFICE
CERTIFICATE OF CORRECTION

PATENT NO.        : 7,076,016 B1                                      Page 1 of 1
APPLICATION NO. : 09/514843
DATED             : July 11, 2006
INVENTOR(S)       : Terry Cole et al.

It is certified that error appears in the above-identified patent and that said Letters Patent is hereby corrected as shown below:

In column 10, line 54, delete "farther," and insert -- further --.

Signed and Sealed this

Fifth Day of December, 2006

JON W. DUDAS
*Director of the United States Patent and Trademark Office*